United States Patent [19]
McClellan

[11] Patent Number: 5,609,321
[45] Date of Patent: Mar. 11, 1997

[54] GOLF CART UMBRELLA HOLDER

[76] Inventor: Joseph E. McClellan, 281 Woodview Rd., West Grove, Pa. 19380

[21] Appl. No.: 494,931

[22] Filed: Jun. 26, 1995

[51] Int. Cl.⁶ .................................................. A47G 25/12
[52] U.S. Cl. .................. 248/534; 248/291.1; 248/227.4; 248/215
[58] Field of Search .................................... 224/274, 275, 224/915, 917.5; 248/514, 539, 289.11, 291.1, 534, 214, 215, 227.4, 213.2, 231.9; 135/16, 19; 280/DIG. 5

[56] References Cited

U.S. PATENT DOCUMENTS

| | | | |
|---|---|---|---|
| D. 311,129 | 10/1990 | Barnhill, III | 248/514 X |
| 1,068,391 | 7/1913 | Jensen | 248/214 |
| 1,162,608 | 11/1915 | Hohl et al. | 248/514 |
| 1,337,867 | 4/1920 | Whitaker | 248/214 |
| 4,008,874 | 2/1977 | Conway, Jr. | 248/534 |
| 4,334,692 | 6/1982 | Lynch | 224/274 X |
| 4,887,786 | 12/1989 | Stokes | 248/539 X |
| 4,974,807 | 12/1990 | Moineau | 224/275 X |
| 5,172,885 | 12/1992 | Kreischer | 248/539 |
| 5,400,933 | 3/1995 | Murray | 224/274 X |
| 5,431,364 | 7/1995 | Etter | 248/514 |

*Primary Examiner*—Ramon O. Ramirez
*Assistant Examiner*—Brian J. Hamilla

[57] ABSTRACT

A holder for supporting an umbrella relative to a golf cart. The inventive device includes a mounting assembly for securing to a golf cart. The mounting assembly includes an elongated base member with a hook at one end to engage a wire basket of the golf cart; and a channel receiver on the lower surface of the base member to accept the seat supporting rail of the golf cart when the holder is pivoted to a horizontal position. An adjustable support assembly is pivotally mounted to the bifurcated second end of the mounting assembly for engaging a center pole of an umbrella to support the umbrella relative to the golf cart. The support assembly includes an elongated support stanchion; a mounting post coupled to the support stanchion; at least one strap secured to the mounting post, the distal ends of the straps having fasteners to fasten about the umbrella. The support assembly is angularly adjustable using a fastener and wing nut directed through the furcations of the base member.

1 Claim, 3 Drawing Sheets

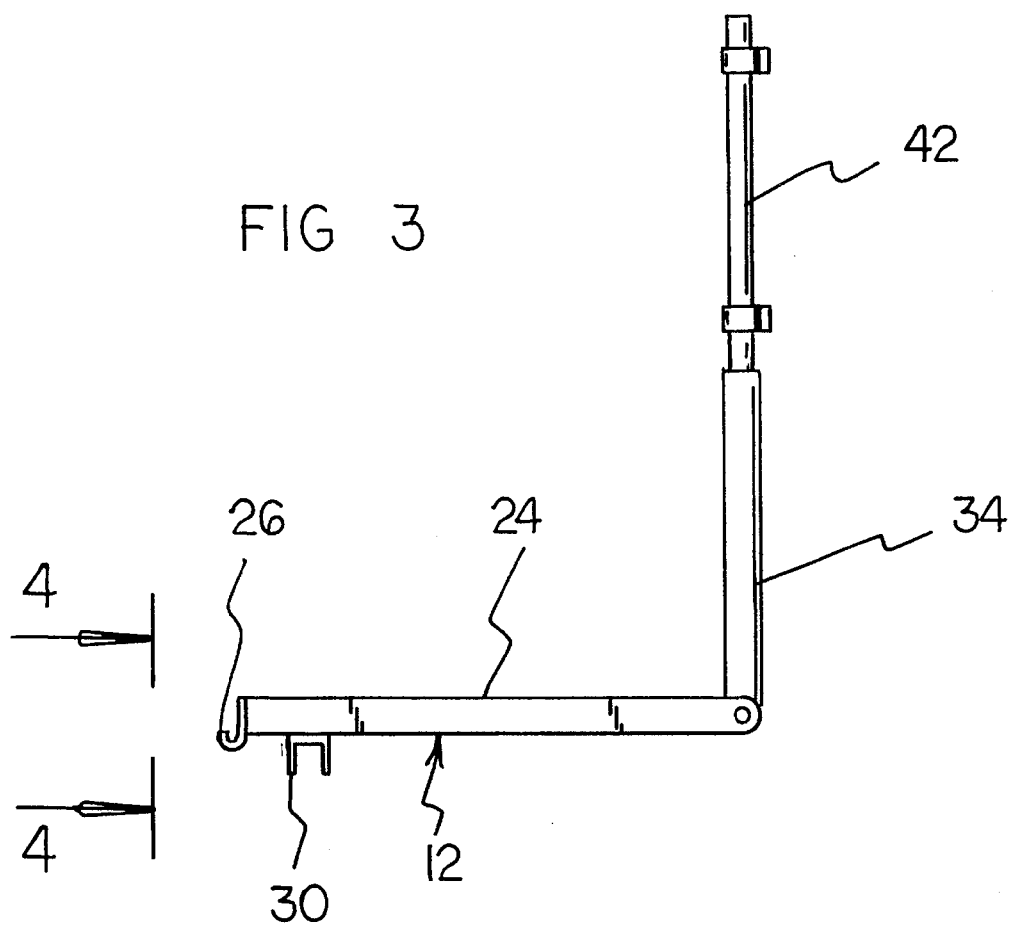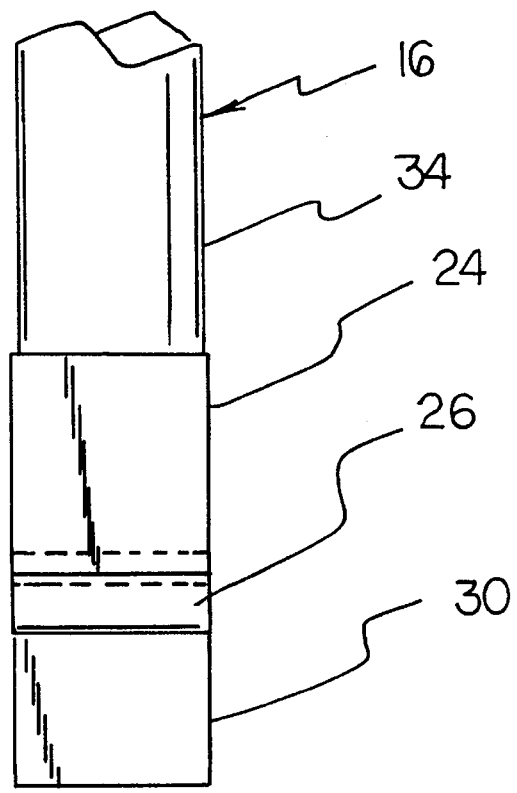

GOLF CART UMBRELLA HOLDER

BACKGROUND OF THE INVENTION

1. Field of the Invention

The present invention relates to canopy support structures and more particularly pertains to a golf cart umbrella holder for supporting an umbrella relative to a golf cart.

2. Description of the Prior Art

The use of canopy support structures is known in the prior art. More specifically, canopy support structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art canopy support structures include U.S. Pat. Nos. 5,310,155; 5,040,763; 4,711,422; 4,974,807; 4,570,894.

While these devices fulfill their respective, particular objectives and requirements, the aforementioned patents do not disclose a golf cart umbrella holder for supporting an umbrella relative to a golf cart which includes a mounting means for securing to a golf cart, and an adjustable support means pivotally mounted to the mounting means for engaging a center pole of an umbrella to support the umbrella relative to the golf cart.

In these respects, the golf cart umbrella holder according to the present invention substantially departs from the conventional concepts and designs of the prior art, and in so doing provides an apparatus primarily developed for the purpose of supporting an umbrella relative to a golf cart.

SUMMARY OF THE INVENTION

In view of the foregoing disadvantages inherent in the known types of canopy support structures now present in the prior art, the present invention provides a new golf cart umbrella holder construction wherein the same can be utilized for supporting an umbrella relative to a golf cart. As such, the general purpose of the present invention, which will be described subsequently in greater detail, is to provide a new golf cart umbrella holder apparatus and method which has many of the advantages of the canopy support structures mentioned heretofore and many novel features that result in a golf cart umbrella holder which is not anticipated, rendered obvious, suggested, or even implied by any of the prior art canopy support structures, either alone or in any combination thereof.

To attain this, the present invention generally comprises a holder for supporting an umbrella relative to a golf cart. The inventive device includes a mounting assembly for securing to a golf cart. An adjustable support assembly is pivotally mounted to the mounting assembly for engaging a center pole of an umbrella to support the umbrella relative to the golf cart.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new golf cart umbrella holder apparatus and method which has many of the advantages of the canopy support structures mentioned heretofore and many novel features that result in a golf cart umbrella holder which is not anticipated, rendered obvious, suggested, or even implied by any of the prior art canopy support structures, either alone or in any combination thereof.

It is another object of the present invention to provide a new golf cart umbrella holder which may be easily and efficiently manufactured and marketed.

It is a further object of the present invention to provide a new golf cart umbrella holder which is of a durable and reliable construction.

An even further object of the present invention is to provide a new golf cart umbrella holder which is susceptible of a low cost of manufacture with regard to both materials and labor, and which accordingly is then susceptible of low prices of sale to the consuming public, thereby making such golf cart umbrella holders economically available to the buying public.

Still yet another object of the present invention is to provide a new golf cart umbrella holder which provides in the apparatuses and methods of the prior art some of the advantages thereof, while simultaneously overcoming some of the disadvantages normally associated therewith.

Still another object of the present invention is to provide a new golf cart umbrella holder for supporting an umbrella relative to a golf cart.

Yet another object of the present invention is to provide a new golf cart umbrella holder which includes a mounting means for securing to a golf cart, and an adjustable support means pivotally mounted to the mounting means for engaging a center pole of an umbrella to support the umbrella relative to the golf cart.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side elevation thereof.

FIG. 4 is an enlarged end elevation view of a portion of the invention taken from line 4—4 of FIG. 3.

DESCRIPTION OF THE PREFERRED EMBODIMENT

Figure 1:
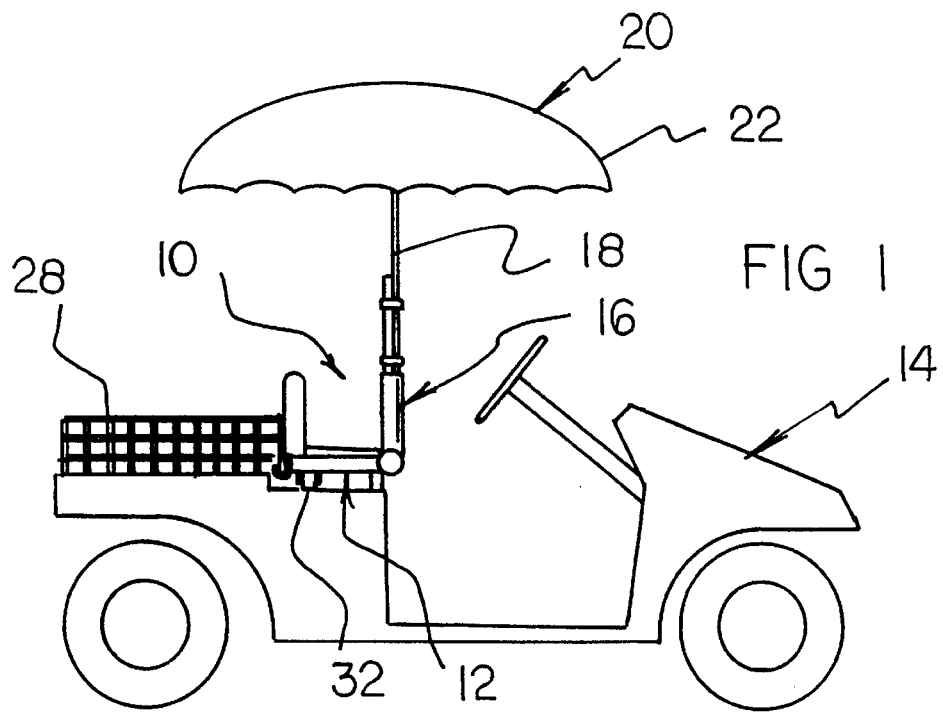
FIG. 1 is a side elevation view of a golf cart umbrella holder according to the present invention in use.
Figure 2:
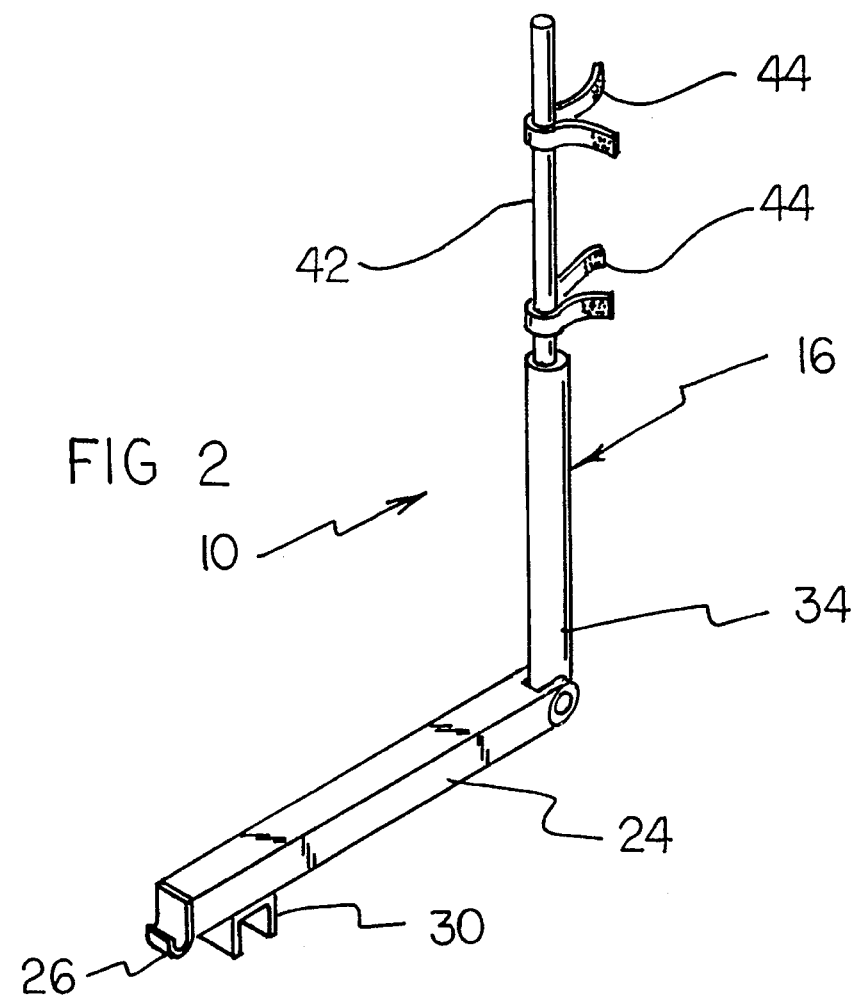
FIG. 2 is an isometric illustration of the present invention, per se.

With reference now to the drawings, and in particular to FIGS. 1–5 thereof, a new golf cart umbrella holder embodying the principles and concepts of the present invention and generally designated by the reference numeral 10 will be described.

More specifically, it will be noted that the golf cart umbrella holder 10 comprises a mounting means 12 for securing to a golf cart 14 substantially as shown in FIG. 1 of drawings. An adjustable support means 16 is adjustably and pivotally mounted to the mounting means 12 for engaging a center pole 18 of an umbrella 20 so as to support the canopy 22 of the umbrella in a desired positioned above the golf cart 14. By this structure, the umbrella 20 can desirably positioned above the seats of the golf cart 14 as shown in FIG. 1 of the drawings.

Referring now to FIGS. 2 through 5 wherein the present invention 10 is illustrated in detail, it can be shown that the mounting means 12 of the present invention 10 preferably comprises an elongated base number 24 having a first end spaced from a second end. A hook 26 is fixedly or otherwise secured to the first end of the base member 24 and operates to engage a portion of the wire basket 28 of the golf cart 14, as shown in FIG. 1. A channel receiver 30 is mounted to a lower surface of the base member 24 and operates to receive and engage a seat supporting rail 32 of the golf cart 14, as also shown in FIG. 1 of the drawings. By this structure, the hook 26 can be engaged to a portion of the wire basket 28, with the base member 24 then being pivotable into a horizontal position such that the seat supporting rail 32 enters the channel receiver 30 to secure the base member 24 relative to the golf cart 14.

Figure 5:
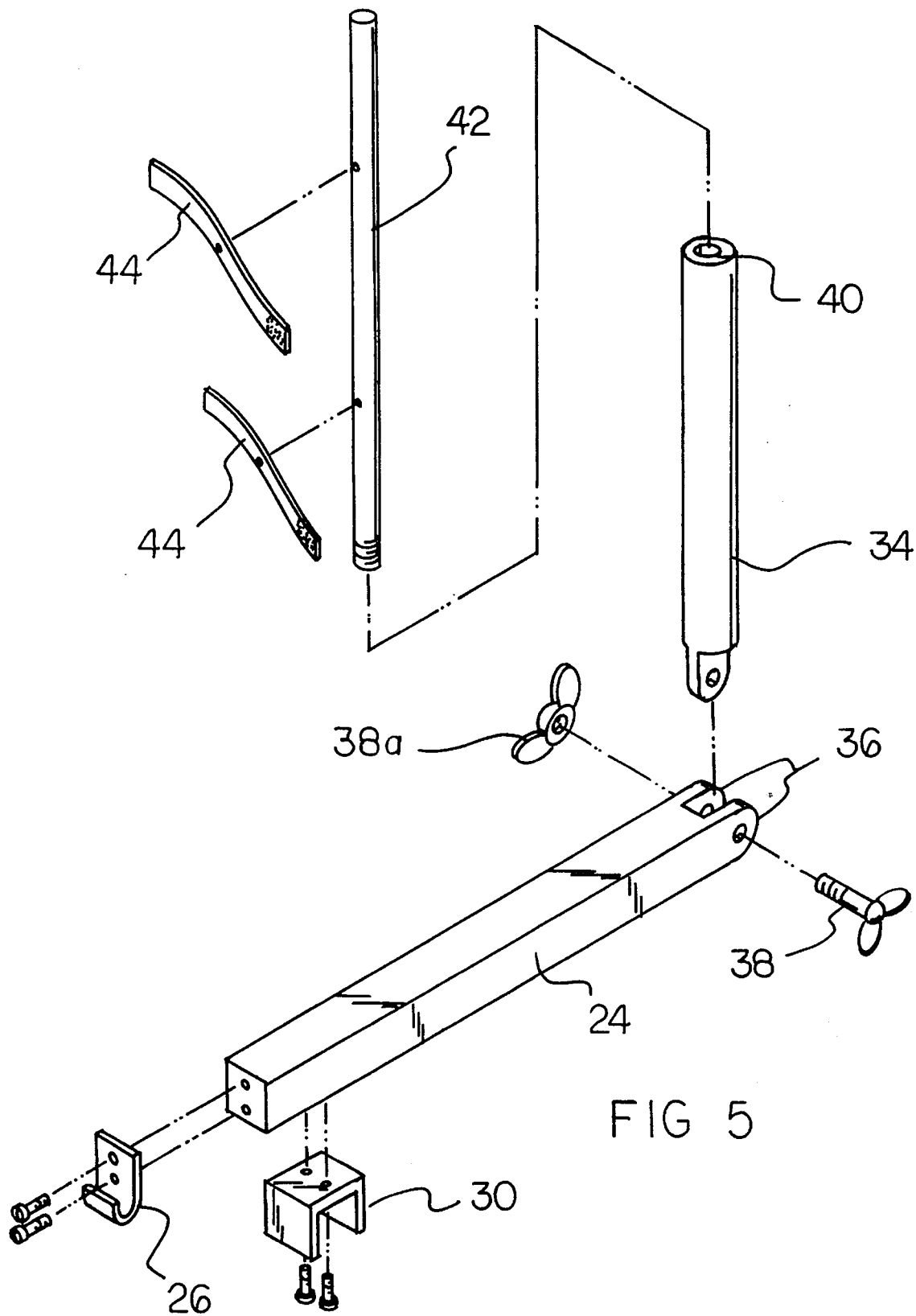
FIG. 5 is an exploded isometric illustration of the present invention.

With continuing reference to FIGS. 2 through 5, it can be shown that the adjustable support means 16 of the present invention 10 preferably comprises an elongated support stanchion 34 pivotally mounted to the second end of the base member 24 of the mounting means 12. To this end, and as shown in FIG. 5, the base member 24 is desirably shaped such that the second end is bifurcated, with a portion of the support stanchion 34 being received between spaced furcations 36 of the second end of the base member 24. A fastener 38 is directed through the furcations 36 of the base member 24 and through a portion of the support stanchion 34 and can be selectively tightened so as to secure a position of the support stanchion 34 relative to the base member 24 as desired. As shown in FIG. 5, an upper end of the support stanchion 34 is shaped so as to define a bore 40 directed thereinto within which the center pole 18 of the umbrella 20 can be received. However, it is preferable that the adjustable support means 16 further comprise a mounting post 42 which is threadably or otherwise positioned within the bore 40 of the support stanchion 34 so as to project upwardly and colinearly therefrom. A pair of straps 44 are secured in a spaced relationship relative to one another to the mounting post 42 and each include free distal ends having a fastener such as a snap, a button, or preferably a hook and loop fabric fastener such as is commonly known by the trademark "VELCRO" secured to the free distal ends thereof. The straps 44 are thus operable to be extended about the center pole 18 of the umbrella 20 and secured so as to couple the umbrella 20 to the adjustable support means 16. It should be noted that a lower end of the center pole 18 may simply rest upon an upper surface of the support stanchion 34 adjacent to the bore 40 within which the mounting post 42 is received. Alternatively, it is contemplated that an additional cylindrical receiver having a bore directed thereinto may be mounted to an exterior surface of the support stanchion 34 so as to receive a lower end of the center pole 18.

In use, the golf cart umbrella holder 10 of the present invention can be easily utilized for supporting an umbrella 20 in a desired angular orientation relative to a golf cart 14 such as is shown in FIG. 1 of the drawings. The specific mounting means 12 utilized in the construction of the present invention 10 allows the device to be easily coupled and decoupled relative to the golf cart 14 without necessitating a use of external fasteners. The adjustable pivotal coupling of the support stanchion 34 to the base member 24 permits the umbrella 20 to be angled as desired by an end user.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed and desired to be protected by Letters Patent of the United States is as follows:

1. A golf cart umbrella holder comprising:
    a mounting means for securing to a golf cart, the mounting means comprises an elongated base member having a first end spaced from a second end, a hook secured to the first end of the base member and being adapted to engage a portion of a wire basket of the golf cart, a channel receiver mounted to a lower surface of the base member and being adapted to receive and engage a seat supporting rail of the golf cart, whereby the hook can be engaged to a portion of the wire basket, with the base member then being pivotable into a horizontal position such that the channel receiver is adapted to accept the seat supporting rail therein to secure the base member relative to the golf cart, the second end of the base member being bifurcated;

an adjustable support means adjustably and pivotally mounted to the mounting means for engaging a center pole of an umbrella so as to support a canopy of the umbrella in a position above the golf cart, the adjustable support means comprises an elongated support stanchion pivotally mounted to the second end of the base member of the mounting means, a mounting post coupled to the support stanchion so as to project upwardly therefrom, at least one strap secured to the mounting post, the strap including free distal ends having fasteners coupled to the ends to permit fastening of the strap about the center pole of the umbrella to couple the umbrella to the adjustable support means, a portion of the support stanchion being received between the spaced furcations of the second end of the base member, a fastener with an associated wing nut directed through the furcations of the base member and through a portion of the support stanchion which can be selectively tightened so as to secure an angular position of the support stanchion relative to the base member, an upper end of the support stanchion being shaped so as to define a bore directed thereinto, with the mounting post being removably positioned within the bore of the support stanchion so as to project upwardly and colinearly therefrom.

* * * * *